US009958597B2

(12) United States Patent
Son et al.

(10) Patent No.: US 9,958,597 B2
(45) Date of Patent: May 1, 2018

(54) BENDABLE DISPLAY DEVICE AND METHOD OF FABRICATING THE SAME

(71) Applicant: SAMSUNG DISPLAY CO., LTD., Yongin-si, Gyeonggi-Do (KR)

(72) Inventors: Younghye Son, Seoul (KR); Changmoo Lee, Suwon-si (KR); Donghwan Kim, Seongnam-si (KR); Seokhyun Nam, Seoul (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 69 days.

(21) Appl. No.: 14/958,240

(22) Filed: Dec. 3, 2015

(65) Prior Publication Data

US 2016/0216436 A1    Jul. 28, 2016

(30) Foreign Application Priority Data

Jan. 28, 2015 (KR) .................. 10-2015-0013709

(51) Int. Cl.
*F21V 7/04* (2006.01)
*F21V 8/00* (2006.01)

(52) U.S. Cl.
CPC .......... *G02B 6/0083* (2013.01); *G02B 6/0011* (2013.01); *G02B 6/0065* (2013.01)

(58) Field of Classification Search
USPC ................................................ 362/611–634
See application file for complete search history.

(56) References Cited

U.S. PATENT DOCUMENTS

| 8,637,880 | B2 | 1/2014 | Roberts | |
|---|---|---|---|---|
| 8,763,291 | B1 | 7/2014 | Nichols | |
| 2004/0149986 | A1* | 8/2004 | Dubowski | H01L 21/268 257/40 |
| 2011/0234939 | A1* | 9/2011 | Kubota | G02B 6/008 349/62 |
| 2014/0056002 | A1 | 2/2014 | Roberts | |
| 2015/0042920 | A1* | 2/2015 | Lee | G02F 1/1336 349/60 |

(Continued)

FOREIGN PATENT DOCUMENTS

| KR | 1020110048173 | 5/2011 |
|---|---|---|
| KR | 1020120135844 | 12/2012 |

(Continued)

*Primary Examiner* — Matthew Mikels
(74) *Attorney, Agent, or Firm* — F. Chau & Associates, LLC

(57) ABSTRACT

Disclosed is display device that includes a display panel including a display surface shaped in a curve. The display surface is defined at an upper side of the display panel. A backlight unit is disposed at a lower side of the display panel. The backlight unit includes a light guiding plate bent along the bending axis. The light guiding plate includes an exit surface parallel with the display surface. The backlight units include a back surface facing the exit surface, and a plurality of connection sides connecting the exit surface with the back surface. At least one of the connection sides defines an incident surface. A circuit board is bent along the bending axis. A plurality of light emission units are electrically connected to the circuit board. The plurality of light emission units emits light to the incident surface. The bending axis is parallel to the incident surface.

20 Claims, 11 Drawing Sheets

(56) References Cited

U.S. PATENT DOCUMENTS

2015/0219940 A1* 8/2015 Kim ...................... G02F 1/1336
362/612

FOREIGN PATENT DOCUMENTS

| KR | 1020140036461 | 3/2014 |
| KR | 1020140052446 | 5/2014 |
| KR | 1020140099730 | 8/2014 |
| WO | 2010071386 | 6/2010 |

* cited by examiner

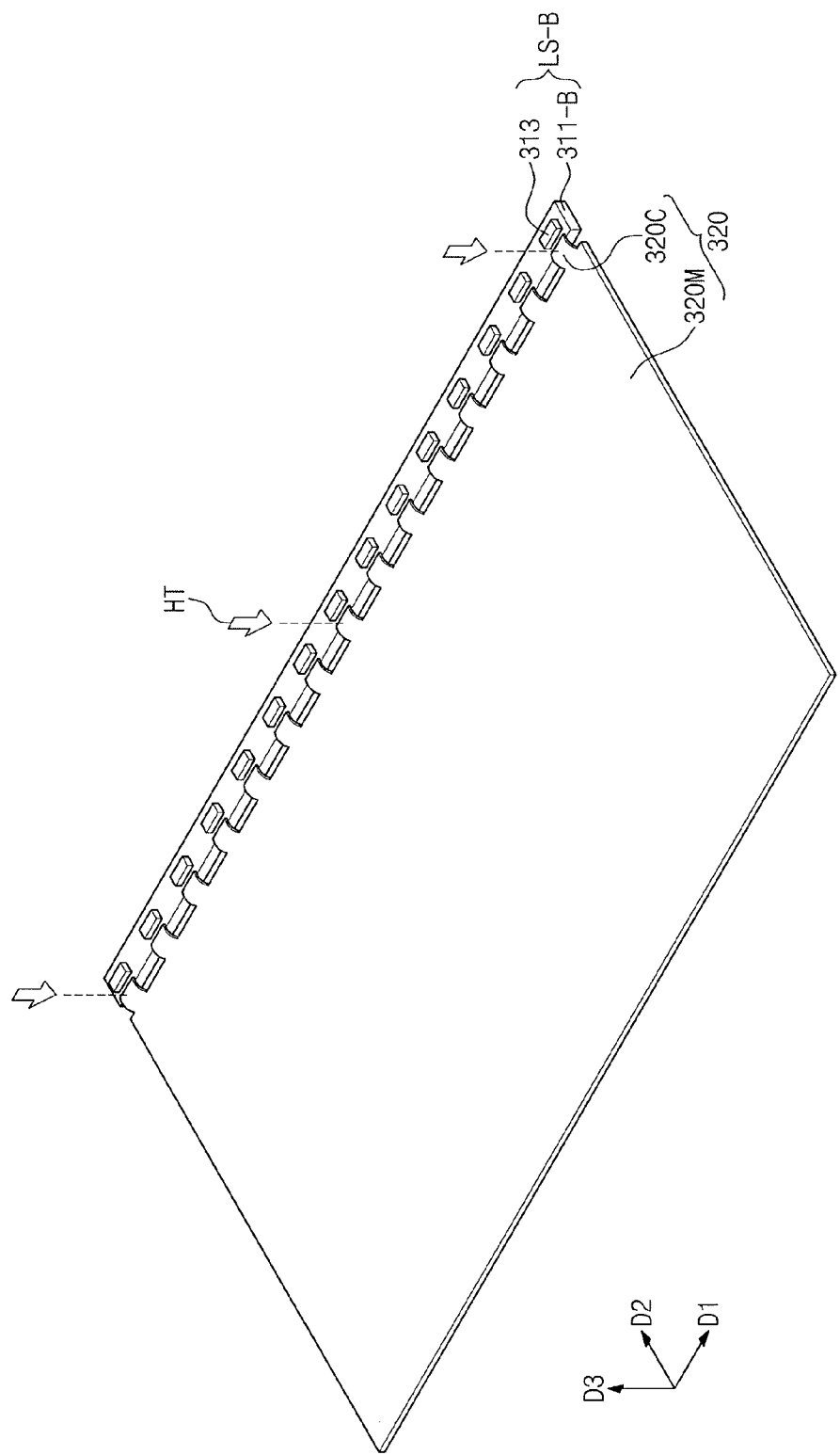

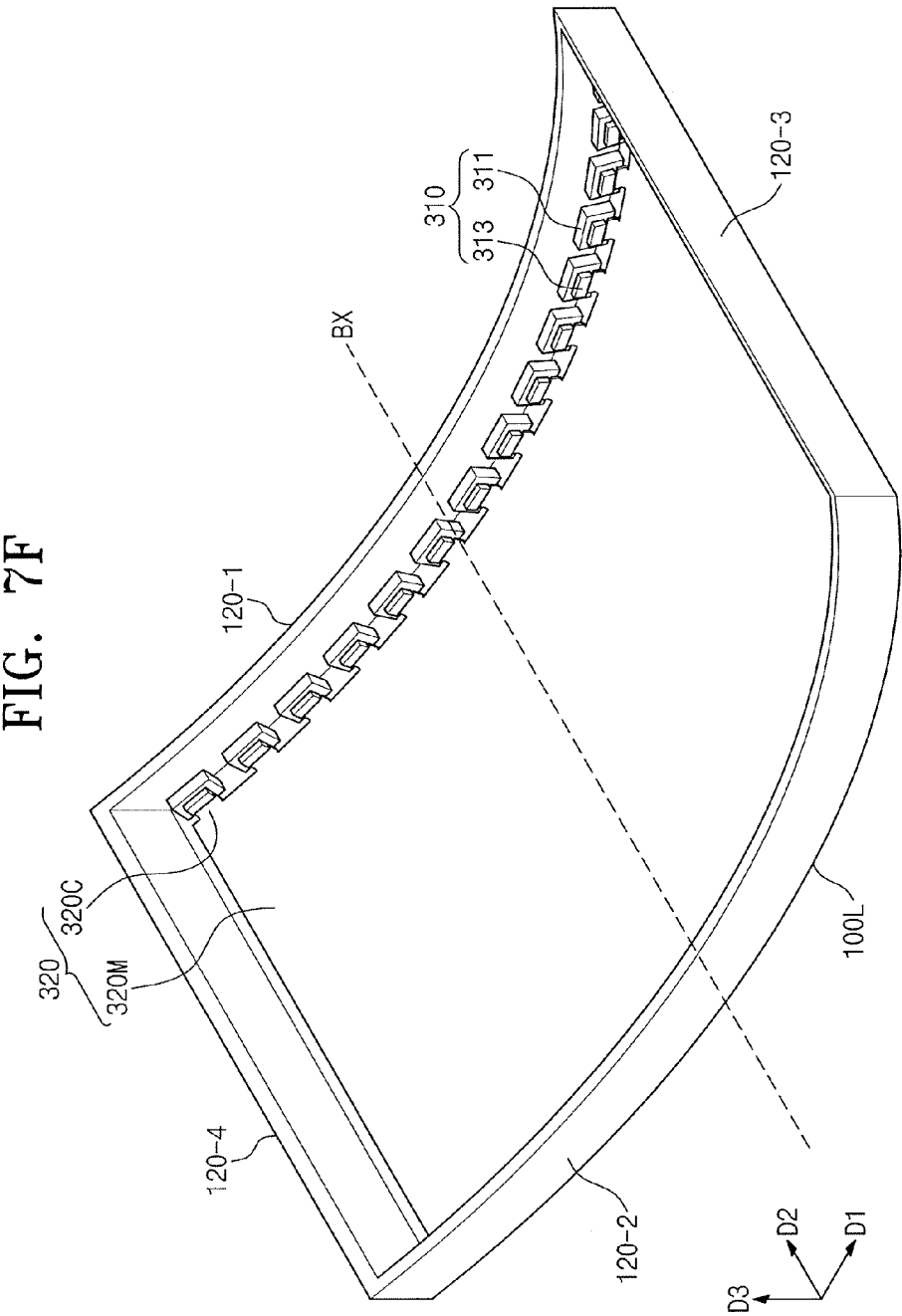

US 9,958,597 B2

BENDABLE DISPLAY DEVICE AND METHOD OF FABRICATING THE SAME

CROSS-REFERENCE TO RELATED APPLICATION

This application claims priority under 35 U.S.C. § 119 to Korean Patent Application No. 10-2015-0013709 filed Jan. 28, 2015, in the Korean Intellectual Property Office, the disclosure of which is incorporated by reference herein in its entirety.

TECHNICAL FIELD

Exemplary embodiments of the present inventive concept relate to a bendable display device, and more particularly to a method of fabricating the same.

DISCUSSION OF RELATED ART

Display devices are generally classified into transmission, semi-transmission, and reflection types. Transmission and semi-transmission display devices may include display panels to display images, and backlight units to supply light to the display panels.

A backlight unit generally includes a light source to generate light, and a light guiding member to guide light from the light source toward the display panel. The light guiding member may receive light through an incident surface and provide the received light to the display panel through an exit surface.

SUMMARY

Exemplary embodiments of the present inventive concept provide a display device including a backlight unit which may provide light in correspondence with a shape of a bendable display panel and may be stably accommodated in a bendable protection member.

In an exemplary embodiment of the present inventive concept, a display device includes a display panel including a display surface having a curved shape. The display surface is defined at an upper portion of the display panel. A backlight unit is disposed at a lower portion of the display panel. The backlight unit includes a light guiding plate. The light guiding plate includes an exit surface having a curved shape corresponding to the curved shape of the display surface. The backlight units include a back surface facing the exit surface, and a plurality of connection sides connecting the exit surface with the back surface. At least one of the connection sides defines an incident surface. A circuit board has a curved shape corresponding to the curved shape of the display surface. A plurality of light emission units are electrically connected to the circuit board. The plurality of light emission units emits light to the incident surface.

The plurality of light emission units may be arranged in a curved shape corresponding to the curved shape of the display surface.

A length of the incident surface may be longer than each length of the connection sides.

The plurality of light emission units may be arranged in a line along the first direction. Each of the light emission units may face the incident surface on a plane parallel with the incident surface. The plurality of light emission units may be adjacent to each other. An interval between the light emission units may be smaller further away from the circuit board.

Each of the light emission units may include at least one LED package, and a circuit block including a mounting surface on which the at least one LED package is mounted. The at least one LED package may face the incident surface and may include an emissive surface emitting light to the incident surface. The emissive surface may be parallel with the mounting surface.

The circuit block may include a conductive substrate, an insulation layer disposed on the conductive substrate, and a first circuit layer disposed on the insulation layer. The first circuit layer may be electrically connected to the at least one LED package. The mounting surface may be disposed on the first circuit layer.

The conductive substrate may include at least one of aluminum or aluminum oxide.

The circuit block may include a reflective layer that is disposed on the first circuit layer.

The circuit board may include a first insulation substrate, a second insulation substrate, and a second circuit layer disposed between the first and second insulation substrates. The first circuit layer may be electrically connected to the second circuit layer.

The circuit board may include a main part parallel with the display surface, and connection parts bent from the main part and connected to at least one of the light emission units. The connection parts may include a portion of the second circuit layer and a portion of the second insulation substrate. The portion of the second circuit layer may be connected to the first circuit layer.

The first circuit layer may include a first signal line disposed on the insulation layer. The first signal line may be connected to the LED package. The first signal line may apply a first voltage to the LED package. A second signal line may be connected to the LED package and may apply a second voltage, which is different from the first voltage, to the LED package. The first and second signal lines may be connected to the second circuit layer through the connection part.

The display device may include a protection member disposed at a lower side of the backlight unit. The protection member may accommodate the display panel and the backlight unit. The protection member may include a bottom bent along the bending axis in parallel with the display surface and sidewalls bent upward from the bottom and surrounding the bottom. The circuit board may be disposed in the bottom. The light emission units may be disposed in at least one of the sidewalls that faces the incident surface.

The mounting surface may be parallel with a sidewall that faces the incident surface. The conductive substrate may be coupled to the sidewall that faces the incident surface.

In an exemplary embodiment of the present inventive concept, a method of fabricating a display device includes providing a light source. An internal space is defined in a protection member and the light source is disposed in the protection member along a bending axis. A light guiding plate, which is bent along the bending axis, is accommodated into the internal space to dispose the light guiding plate on the light source. A display panel, which is bent along the bending axis, is accommodated into the internal space to dispose the display panel on the light guiding plate. The light source includes a first circuit board on which LED packages are mounted and a second circuit board including a main part, and connection parts connected to the main part. The connection parts are disposed along a first direction. The connection parts are isolated from each other. The first circuit board and a second circuit board are electrically connected. The first circuit board is cut out along cutting lines to form light emission units.

The first circuit board may include a conductive substrate, an insulation layer disposed on the conductive substrate, and a first circuit layer disposed on the insulation layer. The first circuit layer may be electrically connected to the LED package. The second circuit board may include a first insulation substrate disposed in the main part, and a second circuit layer disposed on the first insulation substrate. The second circuit layer may be disposed in the main part and the connection parts of the second circuit board. A second insulation substrate may be disposed on the second circuit layer. The second insulation substrate may be disposed in the main part and the connection parts of the second circuit board.

Electrically connecting the first circuit board and the second circuit board may include disposing the connection parts on a side of the first circuit board. At least one of heat, light, and pressure may be provided onto the connection parts to electrically connect the first circuit layer with the second circuit layer, and coupling the connection parts with the first circuit board.

The connection parts may be attached to the first circuit board.

The cutting lines may be defined between the LED packages. The cutting lines may be cut by a laser.

Each of the light emission units may include one of the first circuit boards that are cut out, and at least one of the LED packages. The protection member may include a bottom bent along the bending axis. Sidewalls may be bent upward from the bottom. The sidewalls may surround the bottom.

Disposing the light source in the protection member may include disposing the circuit board on the bottom and disposing the light emission units on at least one of the sidewalls.

The light emission units may be attached to at least one of the sidewalls.

According to an exemplary embodiment of the present inventive concept, a display device may include a light guiding plate having an incident surface which bends along a bending axis, a circuit board bent along the bending axis, and light emission units arranged in the bent shape to provide light toward the incident surface.

Each light emission unit may include a circuit block which has relatively high radiation characteristics but is also rigid, and at least one LED package may be mounted on the circuit block. Thus, the display device according to exemplary embodiments of the present inventive concept may have increased optical efficiency and an increased lifetime because light may be provided to the incident surface which is bendable while heat generated from the LED package is efficiently discharged.

In a method according to an exemplary embodiment of the present inventive concept, after connecting a rigid circuit board with a flexible circuit board, the rigid circuit board may be cut out to form a plurality of light emission units. As the rigid circuit board is sectioned into a plurality of circuit blocks which are isolated each other and are arranged in correspondence with a shape of the flexible circuit board. Thus, since a light source may be easily accommodated in a bendable protection member and light emission units may be arranged even on an incident surface in correspondence with a bending shape, a display device may be provided without restriction against variations of shapes.

BRIEF DESCRIPTION OF THE FIGURES

The above and other features of the present inventive concept will become more apparent by describing in detail exemplary embodiments thereof with reference to the accompanying drawings of which:

FIGS. 7A to 7F are views illustrating a method of fabricating a backlight unit according to an exemplary embodiment of the present inventive concept.

DETAILED DESCRIPTION OF THE EMBODIMENTS

Figure 1:
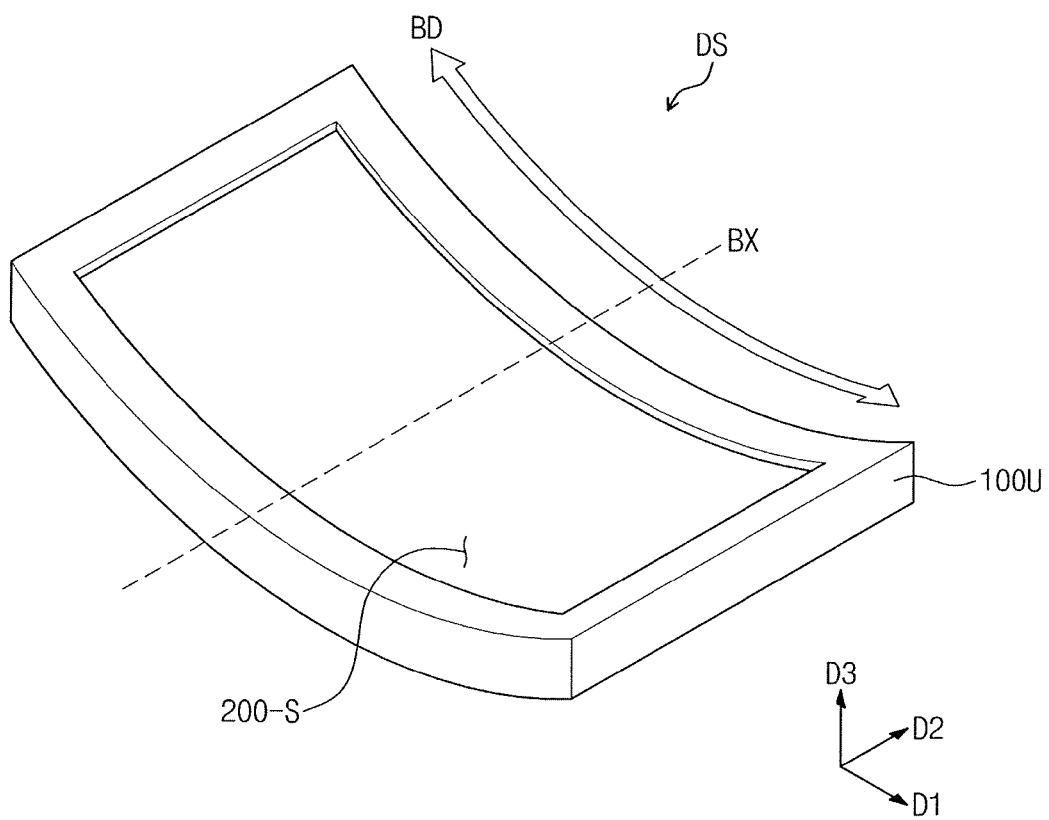
FIG. 1 is a perspective view illustrating a display device according an exemplary embodiment of the present inventive concept.

Exemplary embodiments of the present inventive concept will be described more fully hereinafter with reference to the accompanying drawings, in which exemplary embodiments of the present inventive concept are shown.

Exemplary embodiments of the present inventive concept may, however, be embodied in various different forms, and should not be construed as being limited only to the illustrated embodiments.

Unless otherwise noted, the same and/or similar reference numerals may denote the same and/or similar elements throughout the specification and drawings.

Figure 2:
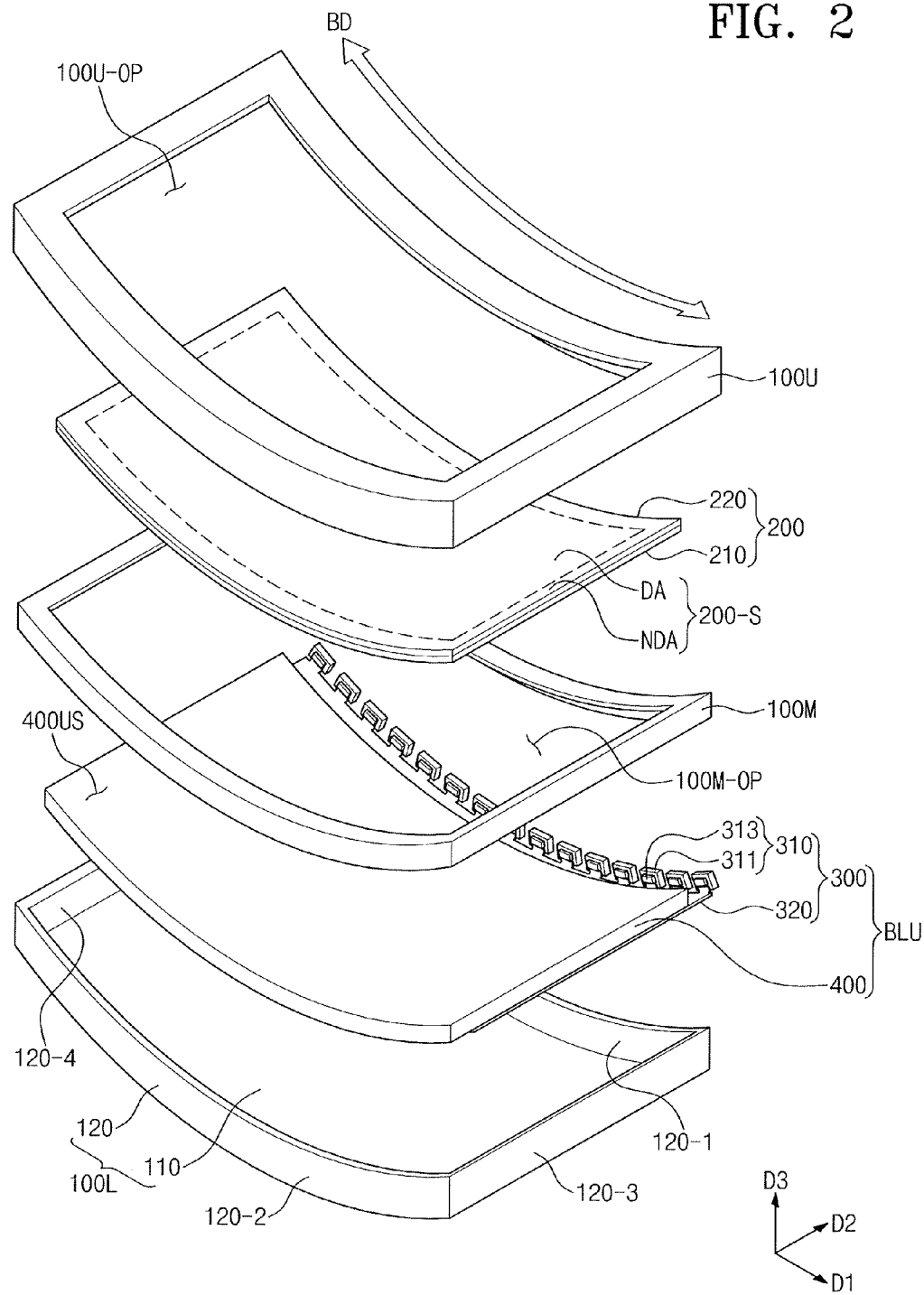
FIG. 2 is a perspective view illustrating a display device according to an exemplary embodiment of the present inventive concept.

FIG. 1 is a perspective view illustrating a display device according an exemplary embodiment of the present inventive concept. FIG. 2 is a perspective view illustrating a display device according to an exemplary embodiment of the present inventive concept.

A display device DS may be bent in an upward direction D3 (direction D3 may be interchangeably referred to as a 'third direction') with respect to a plane that is defined by first and second directions D1 and D2. In an exemplary embodiment of the present inventive concept, the display device DS may be bent in a concave direction BD (the concave direction BD may be interchangeably referred to as a 'bending direction') toward the third direction D3 along a bending axis BX that is defined along the second direction D2.

The display device DS may include a display surface 200-S. The display device DS may display an image.

The display surface 200-S may have a curved shape that is defined along the bending direction BD and the second direction D2. The display device DS according to an exemplary embodiment of the present inventive concept may display an image on the display surface 200-S.

The display device DS may be bent in a direction that is opposite to the third direction D3 along the bending axis BX. The display device DS may have a convex shape and thus the display surface 200-S may have a convex shape. Thus, the display device DS may display an image in various directions. A display device according to exemplary embodiments of the present inventive concept may have various shapes, and exemplary embodiments of the present inventive concept are not restricted to any particular shape.

The display device DS may include a protection member. The protection member may include a plurality of protection members (e.g., an upper protection member 100U, an intermediate protection member 100M, and/or a lower protection member 100L). The display device DS may include a display panel 200, and a backlight unit BLU. The backlight unit BLU may include a light source 300 and a light guiding plate 400.

The protection member may include a plurality of the protection members 100U, 100M, and 100L. The protection member may include the lower protection member 100L, the intermediate protection member 100M, and the upper protection member 100U.

The upper and lower protection members 100U and 100L may form a contour of the display device DS. Thus, the upper and lower protection members 100U and 100L may have a concave shape that bends toward the third direction D3.

The upper and lower protection members 100U and 100L may be coupled to each other in the third direction D3 to accommodate other components. Accordingly, an internal space defined by the upper and lower protection members 100U and 100L may have a concave shape that bends toward the third direction D3. The display panel 200, the intermediate protection member 100M and the backlight unit BLU may be accommodated in the internal space defined by the upper and lower protection members 100U and 100L.

In the upper protection member 100U, an opening 100U-OP may be defined. The opening 100U-OP may expose a partial area of the display surface 200-S, for example a display area DA in which an image is displayed. The upper protection member 100U may cover a non-display area NDA of the display surface 200-S.

The non-display area NDA may be adjacent to the display area DA. The non-display area NDA may be covered by the upper protection member 100U. The non-display area NDA may be disposed in a frame which surrounds the display area DA. An area adjacent to the display area DA (e.g., the non-display area NDA) might not display an image.

The lower protection member 100L may include a bottom 110, and a sidewall 120 bent from the bottom 110. The bottom 110 may have a shape in correspondence with the display panel 200. The bottom 110 may have a curved shape that bends along the bending direction BD in parallel with the display surface 200-S.

The sidewall 120 may be bent from four sides of the bottom 110 in the third direction D3. The sidewall 120 may be sectioned into four sidewalls 120-1 to 120-4 in correspondence with the four sides of the bottom 110.

The sidewalls 120-1 to 120-4 may include first and second sidewalls 120-1 and 120-2 facing each other in the second direction D2, and third and fourth sidewalls 120-3 and 120-4 facing each other in the first direction D1 The first and second sidewalls 120-1 and 120-2 may extend along the bending direction BD. Upper edges of first and second sidewalls 120-1 and 120-2 may be bent along the bending direction BD.

The intermediate protection member 100M may be disposed between the display panel 200 and the backlight unit BLU. The intermediate protection member 100M may support the display panel 200 and may isolate the backlight unit BLU and the display panel 200 from each other in the third direction D3.

In the intermediate protection member 100M, an opening 100M-OP may be defined, which may expose a part of the backlight unit BLU. Light emitted from the backlight unit BLU may be provided to the display panel 200 through the opening 100M-OP. According to an exemplary embodiment of the present inventive concept, the intermediate protection member 100M may be omitted.

The display panel 200 may receive an electrical signal and then display an image on the display surface 200-S. The display panel 200 need not be a particular type of display panel. The display panel 200 may be any type of display panel, as desired. For example, the display panel 200 may be a transmission or semi-transmission type display panel such as an electrophoretic display panel or an electrowetting display panel.

In an exemplary embodiment of the present inventive concept, the display panel 200 may be a liquid crystal display panel. The display panel 200 may include a first substrate 210, a second substrate 220, and a liquid crystal layer disposed between the first and second substrates 210 and 220. An image may be generated by forming an electric field between the first and second substrates 210 and 220 and adjusting transmittance of the liquid crystal layer in accordance with the electric field.

The first and second substrates 210 and 220 may face each other. The first and second substrates 210 and 220 may include insulative films and conductive films. The insulative and conductive films may be stacked alternately. The insulative and conductive films may be used to form thin film transistors, pixels, and diverse signal lines, The backlight unit BLU may be disposed between the display panel 200 and the lower protection member 100L. The backlight unit BLU may be bent along the bending direction BD.

The backlight unit BLU may include the light source 300 and the light guiding plate 400. The light source 300 may include a light emission unit 310 and a circuit board 320.

The light emission unit 310 may emit light to a side of the light guiding plate 400. The light emission unit 310 may include a circuit block 311, and at least one light emitting diode (LED) package 313 which may be disposed on the circuit block 311.

The circuit block 311 may be electrically connected to the LED package 313. The circuit block 311 may transfers an electrical signal, which is provided from the circuit board 320, to the LED package 313.

The LED package 113 may generate light in response to the electrical signal. The LED package 313 may include at least an LED. The LED package 313 may generate light that is unicolored or which includes a plurality of colors.

The backlight unit BLU may include a plurality of light emission units 310. The plurality of light emission units 310 may be arranged in a line to provide light to a side of the light guiding plate 400.

The circuit board 420 may be disposed between the light guiding plate 400 and the bottom 110 of the lower protection member 100L. The circuit board 320 may be bent along the bending direction BD. The circuit board 320 may have a curved shape that is parallel to the display surface 200-S.

The light guiding plate 400 may receive light from the light source 300 and may provide substantially uniform light over the display panel 200. The light guiding plate 400 may provide light to the display panel 200 through an exit surface 400US. The exit surface 400US may have a curved shape corresponding to the display surface 200-S.

Figure 3:
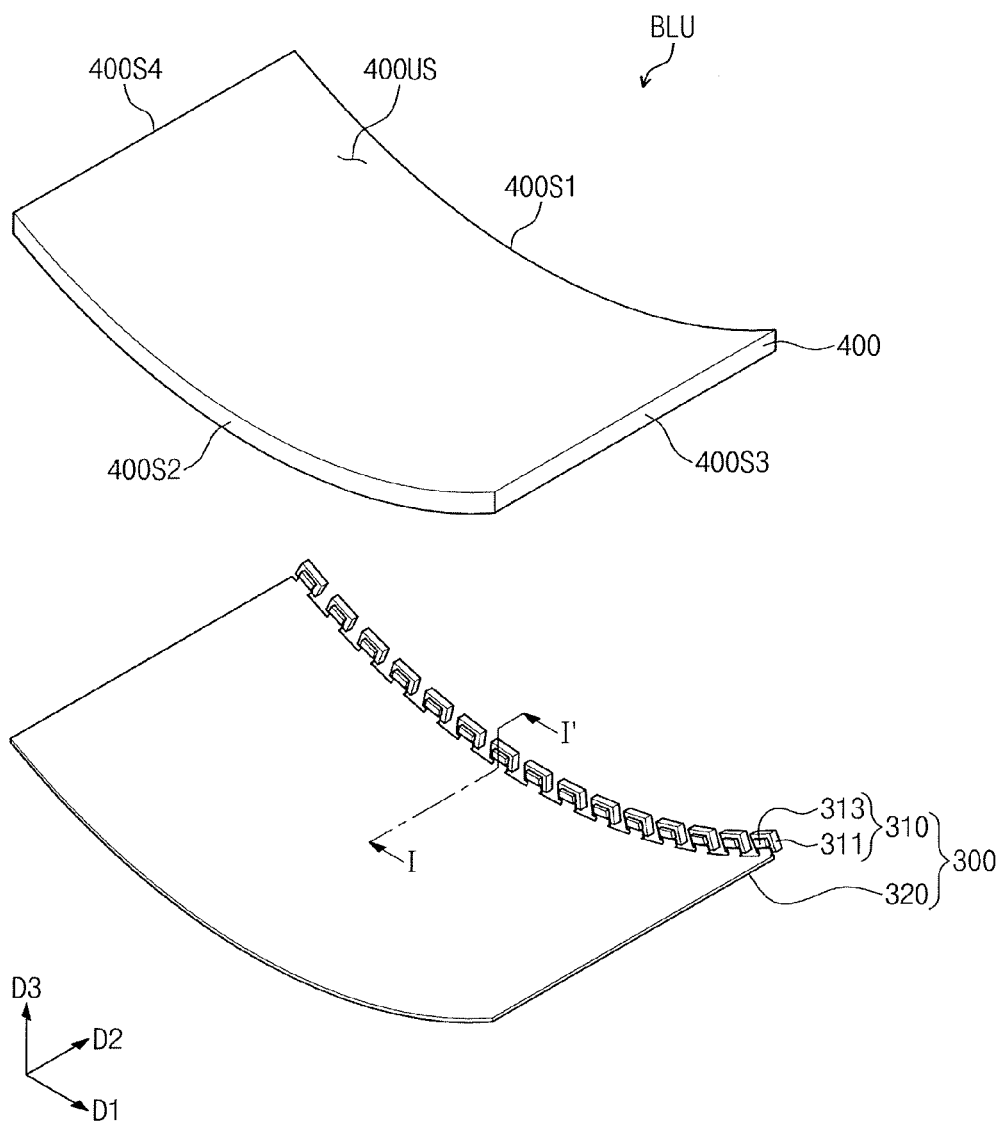
FIG. 3 is a perspective view illustrating a backlight unit according to an exemplary embodiment of the present inventive concept.
Figure 4A:
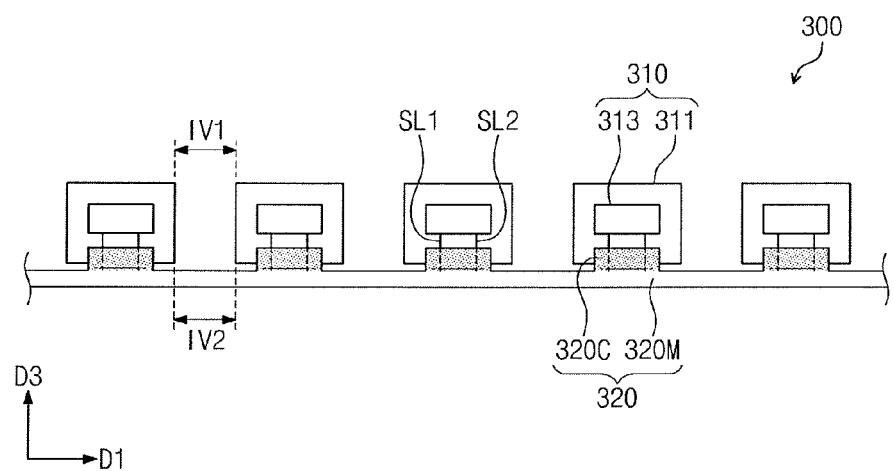
FIGS. 4A and 4B are side views illustrating light source units according to an exemplary embodiment of the present inventive concept.
Figure 4B:
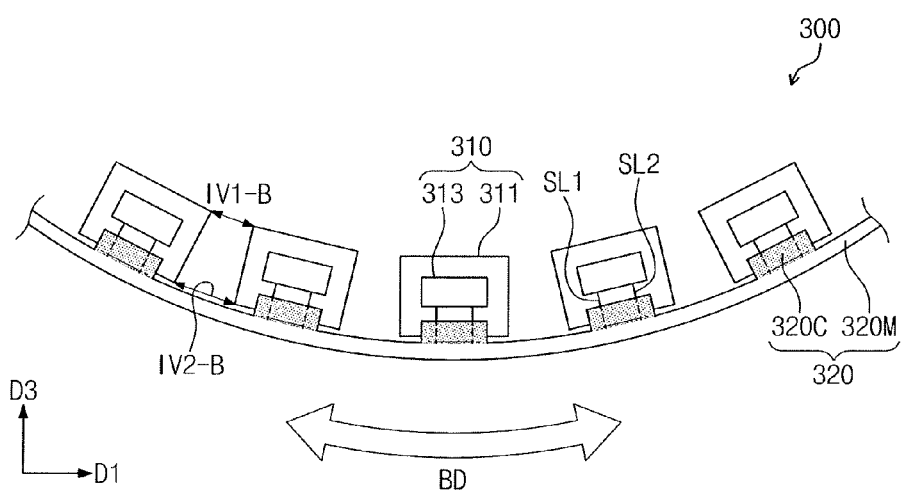

FIG. 3 is a perspective view illustrating a backlight unit according to an exemplary embodiment of the present inventive concept. FIGS. 4A and 4B are side views illustrating a light source unit according to an exemplary embodiment of the present inventive concept.

The light guiding plate 400 may include an exit surface 400US, a back surface facing the exit surface 400US, and connection sides 400S1, 400S2, 400S3, and 400S4 connecting the exit surface 400US and the back surface.

The exit surface 400US may face the display panel 200 (see, e.g., FIG. 2). The light guiding plate 400 may emit light to an outside of the display device through the exit surface 400US. The light guiding plate 400 may have a shape corresponding to the display panel 200, which may provide substantially uniform light over the display panel 200. Accordingly, the exit surface 400US may have a curved shape that bends along the bending direction BD in parallel with the display surface 200-S.

The connection sides 400S1, 400S2, 400S3, and 400S4 may include the first and second connection sides 400S1 and 400S2 which face each other in the second direction D2, and the third and fourth connection sides 400S3 and 400S4 which face each other in the first direction D1. An incident surface may be defined in at least one of the connection sides 400S1, 400S2, 400S3, and 400S4. The light guiding plate 400 may receive light, which is generated from the light source 300, through the incident surface in at least one of the connection sides 400S1, 400S2, 400S3, and 400S4.

The incident surface may be defined in one of the connection sides 400S1, 400S2, 400S3, and 400S4 that extend toward a direction vertical to the bending axis BX. For example, the incident surface may be defined in one of the first and second connection sides 400S1 and 400S2.

The first and second connection sides 400S1 and 400S2 may have a shape extending along the bending direction BD on a plane that is defined by the first and third directions D1 and D3. The first and second connection sides 400S1 and 400S2 may have a curved shape. In an exemplary embodiment of the present inventive concept, the incident surface may be defined in the first connection side 400S1 and may have a curved shape.

In an exemplary embodiment of the present inventive concept, lengths of the first and second connection sides 400S1 and 400S2 extending along the bending direction BD may be longer than lengths of the third and fourth connection sides 400S3 and 400S4 extending along the second direction D2. That is, the first and second connection sides 400S1 and 400S2 may be relatively longer sides, while the third and fourth connection sides 400S3 and 400S4 may be relatively shorter sides. The incident surface according to an exemplary embodiment of the present inventive concept may be defined in the longer side.

The light emission units 310 may be connected to a side of the circuit board 320. The circuit board 320 may include a main part 320M, and a connection part 320C, which may be connected to the main part 320M and may define a side of the circuit board 320.

The connection part 320C may be bent toward the third direction D3 from the main part 320M and may be connected to the light emission unit 310. The connection part 320C may be disposed on a mounting surface of the circuit block 311. The connection part 320C may be coupled to the circuit block 311. The circuit board 320 and the light emission unit 310 may be physically connected each other.

In an exemplary embodiment of the present inventive concept, first and second signal lines SL1 and Sl2 may be disposed in the connection part 320C. The first and second signal lines SL1 and SL2 may be connected to the LED package 313. The light emission unit 310 may be physically, as well as electrically, connected to the main part 320M through the connection part 320C.

The light source 300 may include a plurality of connection parts 320Cy. Each of the plurality of the connection parts 320C may be connected, respectively, with the light emission units 310. In an exemplary embodiment of the present inventive concept, a single connection part 320C may be connected to two or more of the light emission units 310.

Before the circuit board 320 is bent, an arrangement direction of the light emission units 310 may be determined in the first direction D1. The light emission units 310 may be separated from each other by a predetermined interval.

An isolation interval between adjacent light emission units of the light emission units 310 may be differentiated into first and second intervals IV1 and IV2. When the circuit block 311 have a tetragon shape on a plane which is defined by the first and third directions D1 and D3, the first interval IV1, which may be relatively furthest from the circuit board 320, may be substantially identical to the second interval IV2 which may be relatively closest to the circuit board 320.

If the circuit block 320 bends along the bending direction BD, an arrangement direction of the light emission unit 310 may be changed according to the bending direction BD. Since the light emission units 310 may be arranged along a curve, the isolation interval of the light emission units 310 may be variable as they becomes relatively more distant from the circuit board 320.

As the circuit board 320 is bent a first interval IV1-B and a second interval IV2-B may become different from each other. As the circuit board 320 is bent along the bending direction BD, the second interval IV2-B may be substantially fixed while the first interval IV1-B may be reduced and may become relatively smaller than the second interval IV2-B.

A first interval IV1-B may be variable depending on a bending rate of the circuit board 320. As the bending rate of the circuit board 320 increases, the first interval IV1-B may be gradually reduced. The circuit board 320 need not affect the bending by reducing the first interval IV1-B. Therefore, a light source 300 according to exemplary embodiments of the present inventive concept may easily bend along the bending direction BD, even while including a rigid circuit block 310, and may control an exit surface of light in correspondence with the bending direction BD.

If the circuit board 320 bends to have a convex shape with regard to the third direction D3, the first interval IV1-B may become relatively larger than the second interval IV2-B. As a bending rate of the circuit board 320 increases the first interval IV1-B may gradually increase.

The light emission units 310 may be separated from each other by a predetermined interval. Accordingly, the light emission units 310 may be arranged along the bending direction BD without interference with each other.

In the light source 300 according to an exemplary embodiment of the present inventive concept, since an arrangement of the light emission units 310 may be variable according to a shape change of the circuit board 320, the light emission units 310 arranged along the bending direction BD may provide light over the first connection side 400S1, which may be a light incident surface, and may be stably accommodated into the lower protection member 100L which may have a bent shape.

Figure 5:
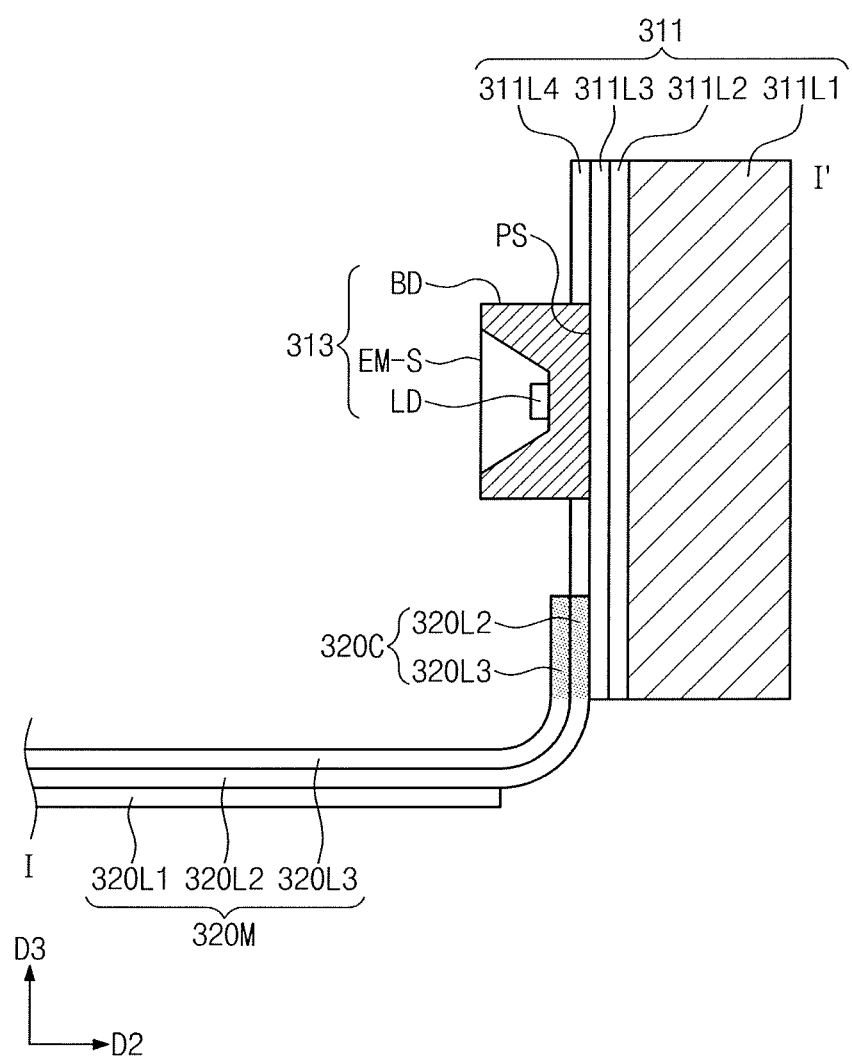
FIG. 5 is a cross sectional view taken along line I-I' of FIG. 3.

FIG. 5 is a cross sectional view taken along line I-I' of FIG. 3. Hereinafter, a structure of the light source 300 will be described in more detail with reference to FIG. 5. The same elements as those shown FIGS. 1 to 3 and FIGS. 4A and 4B may have the same reference numerals and duplicative descriptions may be omitted.

The light emission unit 310 may be connected to a side of the circuit board 320. The circuit block 311 may include a conductive substrate 311L1, an insulation layer 311L2, a first circuit layer 311L3, and a reflective layer 311L4, all of which may be stacked in sequence along the reverse of the second direction D2.

The conductive substrate 311L1 may transfer heat, which may be generated by the LED package 313, to an outside of the display device. Accordingly, the conductive substrate 311L1 may include a material with relatively high thermal conductivity. For example, the conductive substrate 311L1 may include aluminum (Al) or aluminum oxide ($AL_2O_3$).

The insulation layer 311L2 may be disposed on the conductive substrate 311L1. The insulation layer 311L2 may electrically insulate the first circuit layer 311L3 from the conductive substrate 311L1. The insulation layer 311L2 may transfer heat, which may be generated by the LED package 313, to the conductive substrate 311L1.

Accordingly, the insulation layer 311L2 may include a material which has relatively high thermal conductivity and which may electrically insulate the first circuit layer 311L3 from the conductive substrate 311L1. For example, the insulation layer 311L2 may include a thermally conductive polymer, thermally conductive silicon, prepreg including carbon, or carbonic fiber. In an exemplary embodiment of the present inventive concept, the insulation layer 311L2 may include a variety of materials, which are characterized by relatively high thermal conductivity and electrical isolation or insulation, however, exemplary embodiments of the present inventive concept are not limited thereto.

The first circuit layer 311L3 may be electrically connected to the LED package 313. For example, the first circuit layer 311L3 may be connected to electrodes of the LED package 313.

The first circuit layer 311L3 may include conductive lines or pads connected respectively with the electrodes. The first circuit layer 311L3 may receive an electrical signal from the circuit board 320 and may transfer the electrical signal to the LED package 313.

The reflective layer 311L4 may be disposed on the first circuit layer 311L3. The reflective layer 311L4 may cover the first circuit layer 311L3.

The reflective layer 311L4 may include a material which has a relatively high reflectance. The reflective layer 311L4 may reflect and re-project light, which is incident on the light guiding plate 400 (see, e.g., FIG. 3) and which may leak out of the light guiding plate 400 back to the light guiding plate 400. Accordingly, a light leak from the light guiding plate 400 may be reduced or prevented and optical efficiency of the backlight unit BLU may be increased. The reflective layer 311L4 may be omitted in some exemplary embodiments of the present inventive concept.

The LED package 313 may be disposed on the circuit block 311. In an exemplary embodiment of the present inventive concept, a mounting surface PS, on which the LED package 313 is disposed, may be defined in the circuit layer 311L3.

According to some exemplary embodiments of the present inventive concept, the mounting surface PS may be defined in the reflective layer 311L4. The LED package 313 may be electrically connected to the first circuit layer 311L3.

The LED package 313 may include a luminous diode LD and a body BD. The luminous diode LD may generate light in response to an electrical signal which is received from the first circuit layer 311L3.

The luminous diode LD may be a Light Emitting Diode (LED). The luminous diode LD may have a structure in which a first electrode electrically connected to the first circuit layer 311L3, an N-type semiconductor layer, an active layer, a P-type semiconductor layer, and a second electrode, which is opposite to the first electrode and electrically connected to the first circuit layer 311L3, are stacked in sequence.

The body BD may have a concave shape and may have an open top. For example, the body BD may be formed of a plane and a sidewall bending toward from the plane and surrounding the plane. The body BD may define a contour of the LED package 313.

In an exemplary embodiment of the present inventive concept, the LED package 313 may include the luminous diode LD. According to some exemplary embodiments of the present inventive concept, the LED package 313 may include a plurality of LEDs and a light generated by each of the LEDs may have a same color or may have different colors, however, exemplary embodiments of the present inventive concept are not limited thereto.

An emissive surface EM-S may be defined in the LED package 313. The LED package 313 may emit light through the emissive surface EM-S. The emissive surface EM-S may face the first connection side 400S1 of the light guiding plate 400.

In an exemplary embodiment of the present inventive concept, the emissive surface EM-S may be substantially parallel with the mounting surface PS. Accordingly, the LED package 313 may be a top-view type LED package.

The circuit board 320 may be flexible and may be accommodated in the lower protection member 100L (see, e.g., FIG. 2). The circuit board 320 may include a plurality of stacked layers. The plurality of stacked layers may be flexible.

The circuit board 320 may include a first insulation substrate 320L1, a second circuit layer 320L2, and a second insulation substrate 320L3, all of which may be stacked in sequence. The first insulation substrate 320L1 may include polyimide.

The second circuit layer 320L2 may include a conductive material. The second circuit layer 320L2 may provide drive power and an electrical signal, which includes an on/off control signal, to the light emission unit 310. The second circuit layer 320L2 may be supplied with external power by way of a connector.

The circuit board 320 may include a main part 320M and a connection part 320C. The main part 320M may include the first insulation substrate 320L1, the second circuit layer 320L2, and the second insulation substrate 320L3. The main part 320M may be overlaid with the display surface 200-S (see, e.g., FIG. 2) and may be substantially disposed in the lower protection member 110L (see, e.g., FIG. 2).

The connection part 320C may bend toward the third direction D3 from the main part 320M. The connection part 320C may be formed of the second circuit layer 320L2 and the second insulation substrate 320L3. The first insulation substrate 320L1 need not be overlaid with the connection part 320C. Accordingly, the second circuit layer 320L2 of the connection part 320C may be disposed separately from the first insulation substrate 320L1 in the connection part 320C. That is, the connection part 320*c* need not include the first insulation substrate 320L1.

The connection part 320C may be connected to the light emission unit 310. The second circuit layer 320L2 of the connection part 320C may be elongated along the second insulation substrate 320L3 of the connection part 320C, and may be connected to the first circuit layer 311L3 of the light emission unit 310.

In an exemplary embodiment of the present inventive concept, the second insulation substrate 320L3 of the connection part 320C may be physically connected to the light emission unit 310. The second insulation substrate 320L3 of the connection part 320C may be attached to the insulation layer 311L2 or the reflective layer 311L4 of the light emission unit 310.

Figure 6:
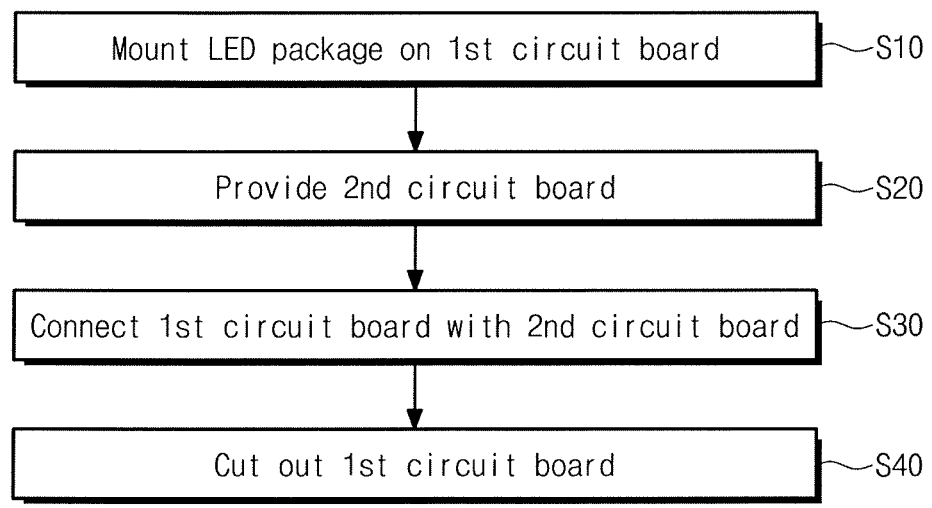
FIG. 6 is a flow chart showing a method of fabricating a backlight unit according to an exemplary embodiment of the present inventive concept.

FIG. 6 is a flow chart showing a method of fabricating a backlight unit according to an exemplary embodiment of the present inventive concept. FIGS. 7A to 7F are views illustrating a method of fabricating a backlight unit according to an exemplary embodiment of the present inventive concept. Hereinafter, a method of fabricating a backlight unit will be described in more detail with reference to FIG. 6 and FIGS. 7A to 7F. The same elements as those shown in FIGS. 1 to 5 may have the same reference numerals and duplicative descriptions may be omitted.

As shown in FIG. 6 and FIGS. 7A to 7F, the plurality of the LED packages 313 may be mounted on a first circuit board 311-B(S10), forming a light source substrate LS-B. The LED packages 313 may be connected to a circuit layer 311-30.

The first circuit board 311-B may include a conductive layer 311-10, an insulation layer 311-20, the circuit layer 311-30, and a reflective layer 311-40, all of which may be stacked in sequence along the third direction D3. The first circuit board 311-B may be relatively rigid.

The LED package 313 may be mounted on a part of the circuit layer 311-30 which is exposed by partly removing the reflective layer 311-40. After mounting the LED package 313 on the circuit layer 311-30, the reflective layer 311-40 may be deposited on the circuit layer 311-30.

Figure 7A:
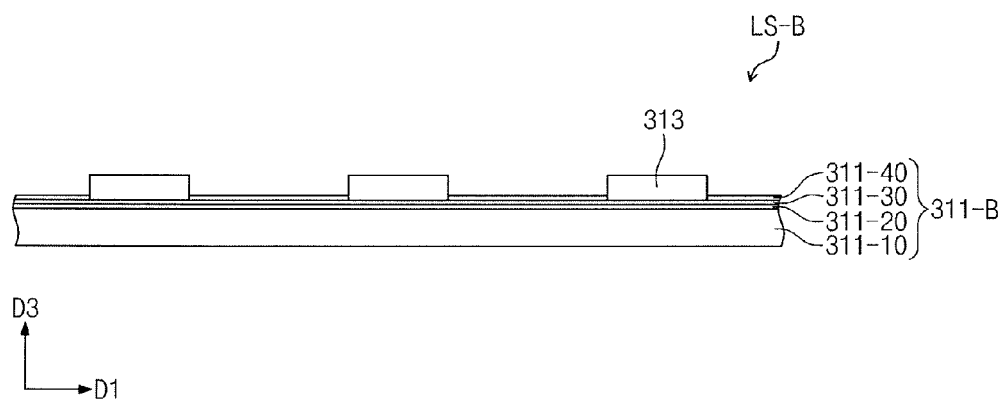
Figure 7B:
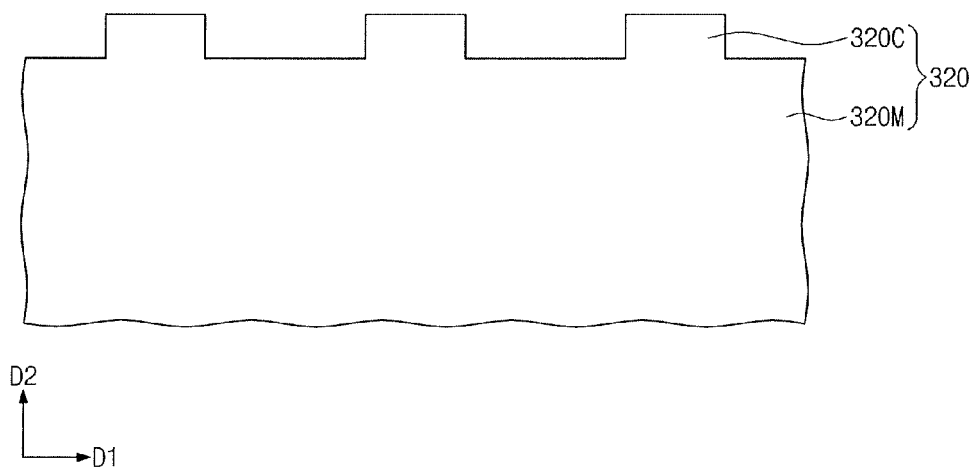

As shown in FIGS. 6 and 7B, the second circuit board (e.g., second circuit board 320) may be provided (S20). In an exemplary embodiment of the present inventive concept, the second circuit board 320 may be relatively flexible.

The second circuit board 320 may include the main part 320M and the connection part 320C. The main part 320M and the connection part 320C may be on a plane which is defined by the first and second directions D1 and D2. The connection part 320C may include a plurality of parts which are protruded toward the second direction D2 from the main part 320M.

The second circuit board 320 may be formed by stacking an insulation substrate and a conductive layer, and then forming another insulation substrate which overlaps the main part 320M and exposes the connection part 320C.

The second circuit layer 320L2 may be formed on the first insulation substrate 320L1. Accordingly, a part of the conductive lines, which may be disposed in the connection part 320C, may be overlaid with the first insulation substrate 320L1, but need not be overlaid with the second insulation substrate 320L3.

As shown in FIGS. 6 and 7C, the first circuit board 311-B may be connected to the second circuit board 320 (S30). To form the plurality of LED packages 313 arranged in the first direction D1, the first circuit board 311-B may be disposed at a side of the second circuit board 320.

During this, the second circuit board 320 may be disposed to place the connection part 320C on a part of the first circuit board 311-B. Accordingly, the main part 320M may be disposed adjacent to the same plane with the first circuit board 311-B and the connection part 320C may be disposed on the first circuit board 311-B.

The connection part 320C may be disposed to make a circuit layer, which is connected to the LED package 313, contact with a circuit layer of the connection part 320C. Conductive lines extending toward the connection part 320C, among the conductive lines disposed in the main part 320M, may be connected respectively with the first and second electrodes of the LED package 313. Accordingly, the LED package 313 may receive an electrical signal which is provided to the main part 320M through the connection part 320C.

Energy may be radiated onto the connection part 320C to couple the connection part 320C with the first circuit board 311-B. A method of fabricating the backlight unit BLU according to an exemplary embodiment of the present inventive concept may be carried out by radiating heat to the connection part 320C to thermally attach the connection part 320C to the first circuit board 311-B.

A method of fabricating the backlight unit BLU according to an exemplary embodiment of the present inventive concept may be carried out by radiating light to the connection part 320C, or by providing pressure to thermally attach the connection part 320C thereto. According to an exemplary embodiment of the present inventive concept, the connection part 320C may be coupled with the first circuit board 311-B by providing an adhesive material between the connection part 320C and the first circuit board 311-B. A method of fabricating the backlight unit BLU according to an exemplary embodiment of the present inventive concept need not be restricted a specific exemplary embodiment. Various methods may be used to electrically connect the LED package 313 with the main part 320M through the connection part 320C, as desired.

Figure 7D:
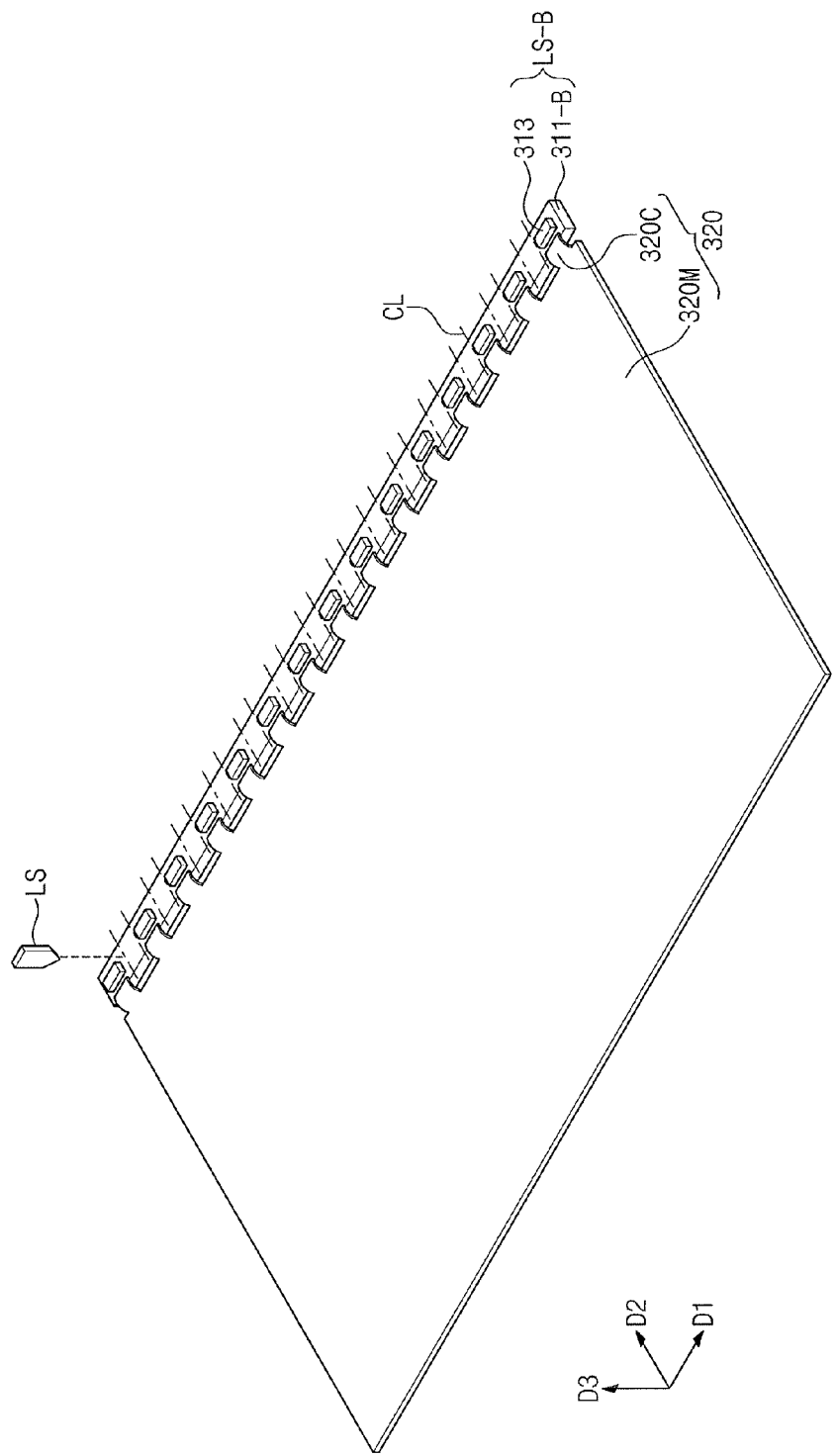
Figure 7E:
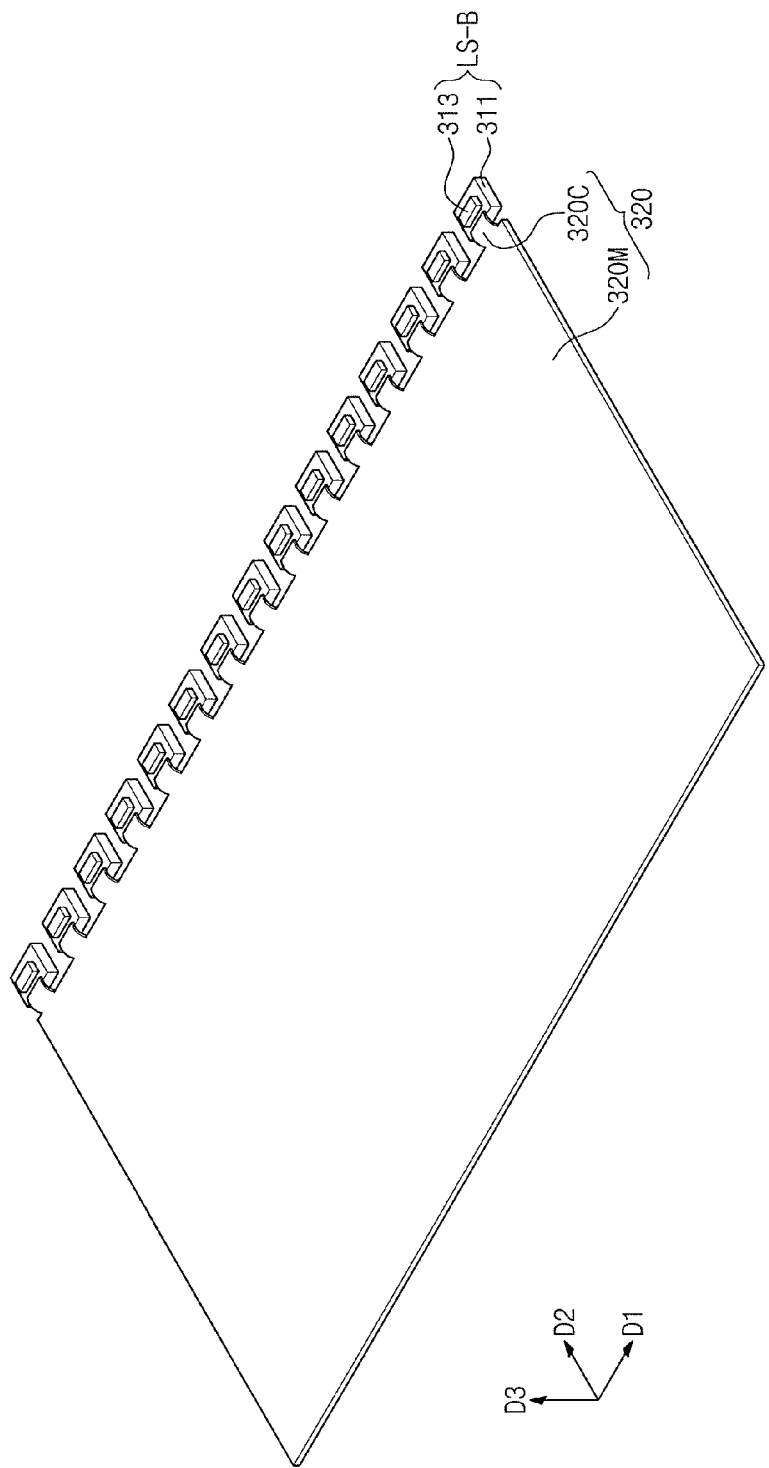

As shown FIGS. 6, 7D, and 7E, the first circuit board 311-B may be cut out (S40) to from the light emission units 310. The first circuit board 311-B may be cut out along predetermined cutting lines CL.

The cutting lines CL may be defined between the LED packages 313. An interval between the cutting lines CL may be determined according to sizes of the circuit blocks 311 and the interval of the plural circuit blocks 311.

In an exemplary embodiment of the present inventive concept, the first circuit board 311-B may be cut out by laser LS. The laser LS may cut out the conductive substrate 311L1, the insulation layer 311L2, the circuit layer 311L3, and the reflective layer 311L4. The laser LS may cut out the conductive substrate 311L1, the insulation layer 311L2, the circuit layer 311L3, and the reflective layer 311L4 at substantially the same time. The first circuit board 311-B according to an exemplary embodiment of the present inventive concept may be cut out in various ways, as desired and exemplary embodiments of the present inventive concept are not limited to a particular cutting method.

As shown in FIG. 7F, according to an exemplary embodiment of the present inventive concept, the light source 300 may be accommodated into the lower protection member 100L. Since the circuit board 320 is relatively flexible, the circuit board 320 may bend in correspondence with a shape of the bottom 110 which may have a curved shape.

The light emission units 310 may be disposed in the first sidewall 120-1. The light emission units 310 may be directly fixed to the first sidewall 120-1 by means of an adhesive member. Accordingly, heat generated from the LED package 313 may be discharged to an outside of the display device through the circuit board 320 and the first sidewall 120-1. Thus, degradation of the LED package 313 may be reduced or prevented and reliability of the light source 300 may be increased.

Since the light emission units 310 may be physically connected to the circuit board 320 through the connection part 320C which is flexible, the light emission units 310 may be easily bent from the circuit board 320 and then disposed therein. Since the light emission units 310 may be separated from each other by the predetermined interval, the light emission units 310 may be stably fixed to the first sidewall 120-1 even though the light emission units 310 are rigid.

According to an exemplary embodiment of the present inventive concept, it may be possible to form the light source 300 which may be disposed along the sidewall which is bent. Therefore, as the LED packages may be disposed even in longer sides, which are shaped to bend along the bending direction BD, as well as in shorter sides which are orthogonal with the bending direction BD and without a change of shape, it may be possible to increase freedom in determining the shape of the light source.

While the present inventive concept has been shown and described with reference to the exemplary embodiments thereof, it will be apparent to those of ordinary skill in the art that various changes in form and detail may be made thereto without departing from the spirit and scope of the present inventive concept.

What is claimed is:

1. A display device comprising:
a display panel comprising a display surface, wherein the display surface has a curved shape curved along a bending axis, and wherein the display surface is defined at an upper portion of the display panel;
a backlight unit disposed at a lower portion of the display panel,
wherein the backlight unit comprises a light guiding plate, wherein the light guiding plate comprises an exit surface having a curved shape corresponding to the curved shape of the display surface, a back surface facing the exit surface, and a plurality of connection surfaces connecting the exit surface with the back surface, at least one of the connection surfaces defining an incident surface;
a circuit board, wherein the circuit board has a curved shape corresponding to the curved shape of the display surface; and
a plurality of light emission units electrically connected to the circuit board, wherein the plurality of light emission units emit light to the incident surface, wherein the bending axis is parallel to a direction of a normal to the incident surface,
wherein the circuit board includes:
a main part parallel with the display surface; and
connection parts bent from the main part to face the incident surface and the connection arts connected to at least one of the light emission units.

2. The display device according to claim 1, wherein the incident surface has four sides and at least one side of the four sides is curved.

3. The display device according to claim 2, wherein a length of the curved side of the incident surface is longer than a length of one connection surface of the connection surfaces.

4. The display device according to claim 2, wherein the plurality of light emission units are arranged in a line corresponding to the curved side of the incident surface on a plane parallel with the incident surface,
wherein the plurality of light emission units are adjacent each other, and
wherein an interval between the light emission units is smaller further away from the circuit board.

5. The display device according to claim 1, wherein each of the light emission units includes:
at least one LED package; and
a circuit block comprising a mounting surface on which the at least one LED package is mounted,
wherein the at least one LED package faces the incident surface and includes an emissive surface emitting light to the incident surface, and
wherein the emissive surface is parallel with the mounting surface.

6. The display device according to claim 5, wherein the circuit block includes:
a conductive substrate;
an insulation layer disposed on the conductive substrate; and
a first circuit layer disposed on the insulation layer, wherein the first circuit layer is electrically connected to the at least one LED package, and wherein the mounting surface is disposed on the first circuit layer.

7. The display device according to claim 6, wherein the conductive substrate includes at least one of aluminum or aluminum oxide.

8. The display device according to claim 6, wherein the circuit block further includes a reflective layer that is disposed on the first circuit layer.

9. The display device according to claim 6, wherein the circuit board includes:
a first insulation substrate;
a second insulation substrate; and
a second circuit layer disposed between the first and second insulation substrates,
wherein the first circuit layer is electrically connected to the second circuit layer.

10. The display device according to claim 9,
wherein the connection parts include a portion of the second circuit layer and a portion of the second insulation substrate, and wherein the portion of the second circuit layer is connected to the first circuit layer.

11. The display device according to claim 10, wherein the first circuit layer includes:
a first signal line disposed on the insulation layer, wherein the first signal line is connected to the LED package, and wherein the first signal line applies a first voltage to the LED package; and
a second signal line connected to the LED package, wherein the second signal line applies a second voltage, which is different from the first voltage, to the LED package, and
wherein the first and second signal lines are connected to the second circuit layer through the connection part.

12. The display device according to claim 6, further comprising a protection member disposed at a lower side of the backlight unit, wherein the protection member accommodates the display panel and the backlight unit, and
wherein the protection member includes:
a bottom bent along the bending axis in parallel with the display surface; and
sidewalls bent upward from the bottom and surrounding the bottom,
wherein the circuit board is disposed in the bottom, and
wherein the light emission units are disposed in at least one of the sidewalls that faces the incident surface.

13. The display device according to claim 11, wherein the mounting surface is parallel with a sidewall that faces the incident surface, and
wherein the conductive substrate is coupled to the sidewall that faces the incident surface.

14. A method of fabricating a display device, the method comprising:
  providing a light source;
  defining an internal space in a protection member and disposing the light source in the protection member, wherein the protection member is bent along a bending axis;
  accommodating a light guiding plate, which is bent along the bending axis, into the internal space to dispose the light guiding plate on the light source; and
  accommodating a display panel so that the display panel is bent along the bending axis, into the internal space to dispose the display panel on the light guiding plate,
  wherein the light source includes:
  a first circuit board on which LED packages are mounted; and
  a second circuit board comprising a main part, and connection parts connected to the main part, wherein the connection parts are arranged in a first direction normal to the bending axis, and wherein the connection parts are isolated from each other;
  electrically connecting the first circuit board with the second circuit board; and
  cutting out the first circuit board along cutting lines to form light emission units isolated from each other along the first direction, wherein the cutting lines are defined in the first circuit board,
  wherein the electrically connecting of the first and second circuit boards comprises:
  disposing the connection parts on a side of the first circuit board; and
  providing at least of heat, light, and pressure onto the connection parts to electrically connect the first circuit board with the second circuit board, and to couple the connection parts with the first circuit board.

15. The method according to claim 14, wherein the first circuit board includes:
  a conductive substrate;
  an insulation layer disposed on the conductive substrate; and
  a first circuit layer disposed on the insulation layer, wherein the first circuit layer is electrically connected to at least one LED package,
  wherein the second circuit board includes:
  a first insulation substrate disposed in the main part;
  a second circuit layer disposed on the first insulation substrate, wherein the second circuit layer is disposed in the main part and the connection parts of the second circuit board; and
  a second insulation substrate disposed on the second circuit layer, wherein the second insulation substrate is disposed in the main part and the connection parts of the second circuit board.

16. The method according to claim 15, wherein the electrically connecting of the first and second circuit boards comprises:
  electrically connecting the first circuit layer with the second circuit layer.

17. The method according to claim 16, wherein the connection parts are attached to the first circuit board.

18. The method according to claim 14, wherein the cutting lines are defined between the LED packages, and
  wherein the cutting lines are cut by a laser.

19. The method according to claim 18, wherein each of the light emission units includes:
  one of the first circuit boards that are cut out; and at least one of the LED packages,
  wherein the protection member includes:
  a bottom bent along the bending axis; and
  sidewalls bent upward from the bottom, wherein the sidewalls surround the bottom, and
  wherein the disposing of the light source in the protection member includes:
  disposing the circuit board on the bottom and disposing the light emission units on at least one of the sidewalls.

20. The method according to claim 19, wherein the light emission units are attached to at least one of the sidewalls.

* * * * *